E. J. CRAWFORD.
NON-SKID DEVICE.
APPLICATION FILED MAR. 6, 1917.

1,249,722.

Patented Dec. 11, 1917.
2 SHEETS—SHEET 1.

WITNESSES:
F. C. Matheny
R. J. Cook

INVENTOR
EDGAR J. CRAWFORD
BY
Cook & Matheny
ATTORNEYS

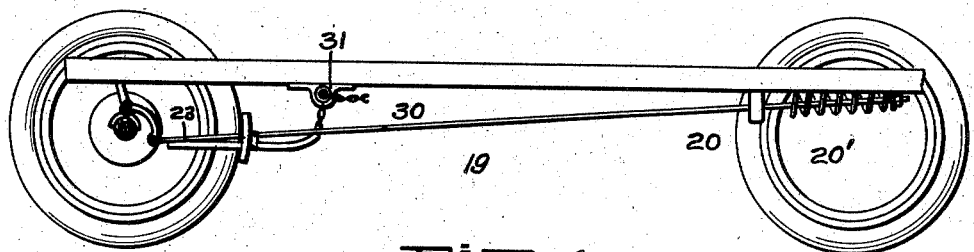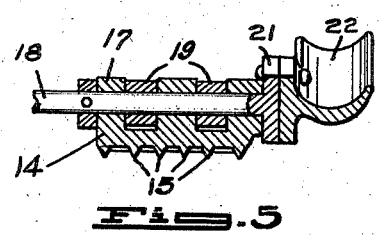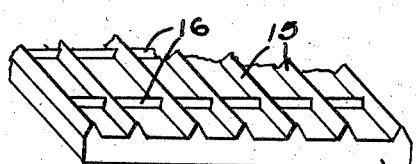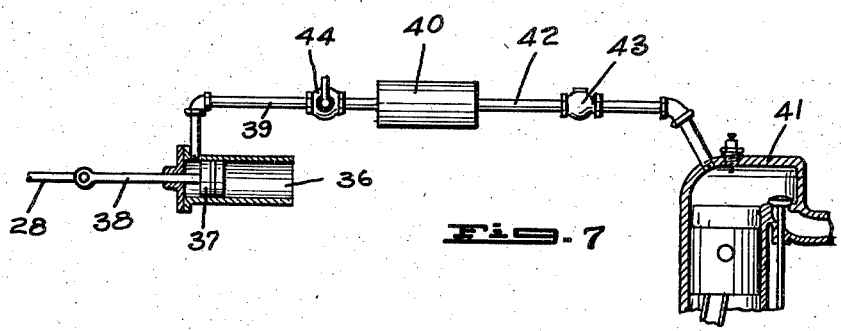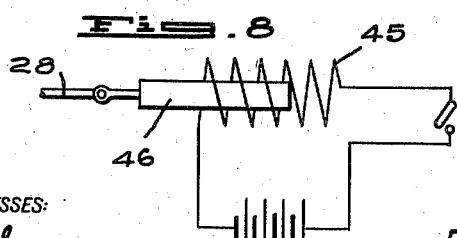

UNITED STATES PATENT OFFICE.

EDGAR J. CRAWFORD, OF SEATTLE, WASHINGTON, ASSIGNOR OF ONE-HALF TO
J. EUGENE JORDAN, OF SEATTLE, WASHINGTON.

NON-SKID DEVICE.

1,249,722. Specification of Letters Patent. Patented Dec. 11, 1917.

Application filed March 6, 1917. Serial No. 153,481.

*To all whom it may concern:*

Be it known that I, EDGAR J. CRAWFORD, a citizen of the United States, residing at Seattle, in the county of King and State of Washington, have invented a new and useful Improvement in Non-Skid Devices, of which the following is a specification.

This invention relates to improvements in non-skid devices for motor vehicles and the object of this improvement is to provide a simple and easily operated device that may be installed on motor cars, and is adapted to be lowered at the will of the driver to lift the rear wheels of a vehicle off of the roadbed so that the rear end of the vehicle will be supported on the runners of the non-skid device instead of on the rear wheels.

A further object is to provide a device of this class that is adapted to be carried down into an operative position by the rotation of the rear wheels and automatically lifted into a neutral position as soon as it is released by reversing the direction of rotation of the wheels.

A still further object is to provide a device of this class that is out of sight and out of the way when it is not in use, and one that may be easily operated either by foot power, compressed air from the engine or by electricity.

The invention consists in the novel construction, adaptation, and combination of parts of a non-skid device with a motor vehicle, as will be more clearly described and claimed.

Figure 1:
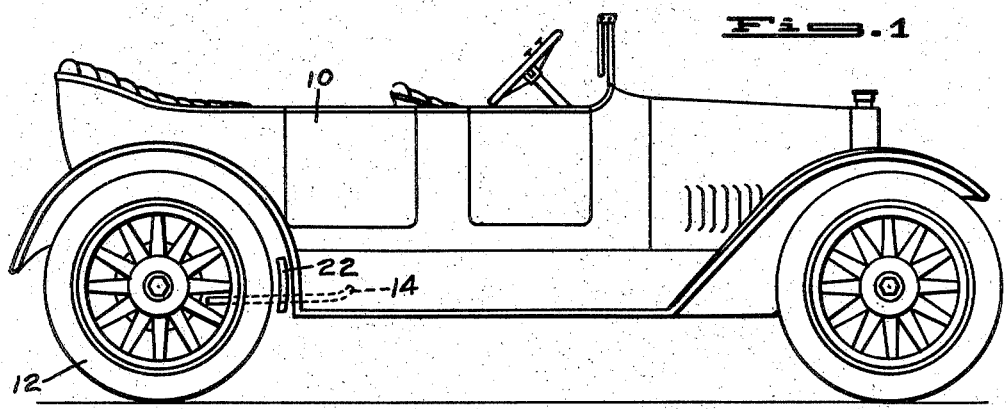
Figure 2:
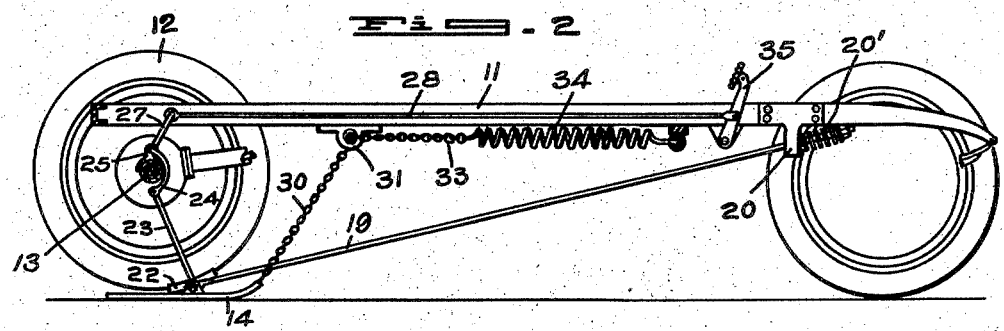
Figure 3:
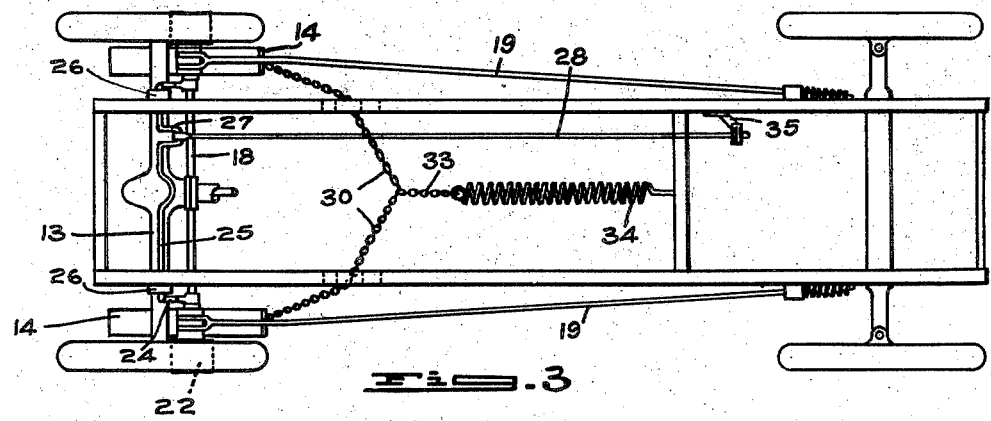

In the accompanying drawings Figure 1 is a view in side elevation of a motor car upon which this invention is installed, showing the device in an inoperative position; Fig. 2 is a skeleton view in side elevation with parts removed of a car frame showing this non-skid device in an operative position; Fig. 3 is a plan view of the device shown in Fig. 2; Fig. 4 is a view similar to Fig. 2 illustrating the non-skid mechanism in an inoperative or raised position; Fig. 5 is a view in cross-section of one of the runners or shoes embodied in this invention; Fig. 6 is a fragmentary view in perspective on an enlarged scale illustrating the manner of forming ridges on the bottoms of the runners; Fig. 7 is a somewhat diagrammatic view partly in section and partly in elevation illustrating a method of operating this non-skid device by compressed air, and Fig. 8 illustrates electrical apparatus for operating the device.

Referring to the drawings throughout which like reference numerals indicate like parts, the numeral 10 indicates the body of an automobile, 11 indicates the frame and 12 the rear wheels that are mounted on a suitable axle disposed within an axle housing 13.

The non-skid apparatus consists of two runners 14 that are curved upwardly at their forward ends like the runners of a sled and are provided at their bottom surfaces with triangularly shaped longitudinal ridges 15 and smaller transverse ridges 16 as more clearly shown in Fig. 6.

The runners 14 are each provided on the top side near the center with upwardly directed bifurcated lugs 17 that are connected by means of a cross rod 18 with drag bars 19 that extend through holes in brackets 20 near the forward part of the frame members 11 and are provided in front of such brackets with compression springs 20', as more clearly shown in Fig. 2.

The ends of the cross rod 18 are flanged on the outer side of each runner as indicated at 21, Fig. 5, to form supports upon which are riveted shoes 22 that are adapted to engage with the tires of the wheels 12 when the device is in an operative position.

The rod 18 connects the two shoes on opposite sides of the car and is supported by two links 23 that are pivotally connected at one end to the rod 18 and at the other end to curved lever arms 24 on the ends of a transverse bar 25 that is rotatably mounted in fixed brackets 26 secured to the axle housing 13.

The bar 25 is provided with a crank member 27 that is connected with an actuating rod 28 that extends forwardly and connects with suitable devices by which power may be applied to turn the bar 25.

The forward ends of the runners 14 are connected with chains or cables 30 that pass upwardly through guides 31 on the frame, thence toward the center of the car and unite in, or are connected with, another chain or cable 33 that extends forward and is secured to a helical tension spring 34 of sufficient strength to lift and hold the non-skid devices in an inoperative position when they are not in use.

The actuating rod 28 may be connected with a fulcrumed foot lever 35 as shown in Fig. 2, so that when the non-skid mechanism is inoperative and the foot lever 35 is moved forward the rotatable bar 25 will be turned clockwise from the position shown in Fig. 4 and the shoes 22 will be drawn into contact with the tires of the rear wheels 12 and carried downwardly into the position shown in Fig. 2.

Fig. 7 illustrates a pneumatic cylinder 36 for operating the non-skid device, such cylinder having a piston 37 connected with a piston rod 38 that is articulated with the end of the actuating rod 28. The cylinder 36 is fastened to the frame of the car and may be connected by a pipe 39 with a compression chamber 40 that is connected with the cylinders of an engine 41 by a pipe 42 in such manner that compression in the chamber 40 is maintained by the engine 41, there being a check valve 43 interposed in the pipe 42 to prevent the return of compressed air to the engine cylinders.

The pipe 39 is provided with a valve 44 that may be operated from the driver's seat to admit pressure to the cylinder 36 and move the piston 37 forwardly thus drawing the shoes 22 into contact with the tires of the wheels 13 and causing the runners 14 to be carried downwardly thereby.

Fig. 8 illustrates a solenoid or electromagnet 45 having a core 46 that is connected with the actuating rod 28 for operating the same.

The device is installed on a motor car substantially as shown and is normally held in the position illustrated in Figs. 1 and 4 by the spring 34. In this position all of the parts are out of the way and are for the most part out of sight as illustrated in Fig. 1.

When it is necessary to use the device as a non-skid or emergency brake, the actuating mechanism is manipulated to bring the shoes 22 in contact with the tires of the wheels 12 so that the tension of the spring 34 will be overcome and the shoes and runners carried downwardly until the wheels 12 are lifted onto the shoes 22 and the rear end of the car is supported on the runners 14.

The ridges 15 on the bottoms of the runners will normally engage with and cut into an icy or slippery pavement or road bed sufficiently to arrest any skidding movement and bring the car to a quick stop.

If the car is on ice and tends to slide, due to its momentum, the longitudinal ridges 15 will cut into the ice deep enough to permit the transverse ridges to come in contact with the surface and arrest the movement of the car.

When the car is stopped it may be thrown into reverse and backed off of the shoes 22 thereby permitting the spring 34 to automatically lift the shoes and runners into the position shown in Fig. 1.

As the runners are lifted the upturned forward ends thereof will engage under the draw bars 19 and cause the runners 14 and shoes 22 on both sides to move upwardly at the same time and assume the position shown in Fig. 4.

The shoes 22 normally lie in close proximity to the fender of the car as shown in Fig. 1 so that only the sides of such shoes are visible. It is obvious that changes in the shape and arrangements of the various parts embodied in this device will be resorted to in adapting the device to various types of cars.

It is not necessary to have the spring 34 strong enough to lift the non-skid devices for the reason that when the wheels are turned in a reverse direction the shoes 22 will remain in contact with the tires and can be carried upwardly thereby into the position shown in Figs. 1 and 4, the spring 34 therefore only needs to be strong enough to hold the non-skid devices in the inoperative position after they have been lifted.

It is obvious that changes in the form of construction of the various parts of this device may be resorted to within the scope of the appended claims.

What I claim and desire to protect by Letters Patent is:

1. A non-skid device for a motor vehicle comprising shoes for engaging with and supporting the rear wheels of said motor vehicle, runners offset with respect to said shoes and adapted to rest upon a roadbed inside of said wheels, draw bars connecting said runners to the frame of said vehicle and means for supporting said runners and shoes in an inoperative position.

2. A non-skid device for a motor vehicle comprising runners adapted to rest upon the roadbed just inside of the rear wheels of a vehicle, shoes secured to the outer sides of said runners to support said rear vehicle wheels and means connecting said shoes and runners with the frame of said vehicle whereby they may be raised into an inoperative position, the said shoes being adapted to lie in close proximity to the under side of the rear fenders of said vehicle and said runners being adapted to lie inside of the fenders of said vehicle to be substantially out of sight.

3. The combination with a vehicle of non-skid devices comprising shoes adapted to engage with the rear wheels of said vehicle, runners rigidly connected with the sides of said shoes and adapted to rest upon the ground to support the rear end of the vehicle, means for automatically raising said shoes and runners simultaneously, draw bars connected with said runners, and arms supporting said shoes and runners for circumferential movement around said wheel.

4. The combination with a vehicle, of non-skid devices comprising two runners, a cross bar connecting said two runners, shoes secured to the cross bar outside of said runners, said shoes being adapted to engage with the rear wheels of said vehicle, drag bars secured to said runners and slidably connected with the frame of said vehicle, means for automatically lifting said runners into an inoperative position, means supporting said shoes and runners for circumferential movement with respect to said wheels, and means for bringing said shoes into engagement with said vehicle wheels.

5. The combination with a vehicle, of a non-skid device comprising two runners adapted to rest upon the road bed inside of the two rear wheels of said vehicle, a cross bar connecting said two runners, shoes rigidly secured to said cross bar on the outer sides of said runners and adapted to support said wheels, draw bars secured to said runners and slidably connected with the front portion of said vehicle frame, a rotatable shaft extending crosswise of the frame of said vehicle adjacent the rear axle thereof, lever arms on the ends of said shaft, links connecting said lever arms with said cross bar to support said shoes and runners for circumferential movement with respect to said wheels, means for turning said shaft to draw said shoes into contact with said rear wheels, and means for automatically lifting said non-skid devices into an inoperative position.

Signed by me at Seattle, Washington, this 28th day of February, 1917.

EDGAR J. CRAWFORD.

Witnesses:
E. B. HERALD,
R. J. COOK.